Figure 1:
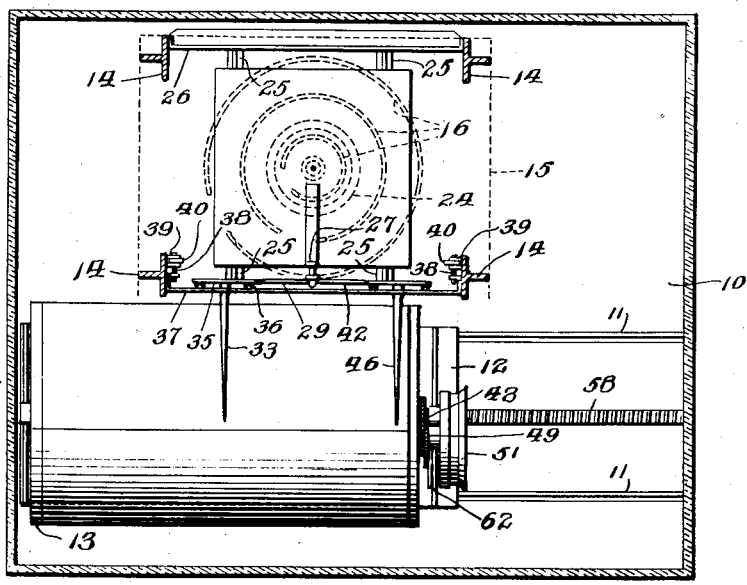

T. O'BRIEN.
SEISMOGRAPH.
APPLICATION FILED DEC. 6, 1912.

1,095,022.

Patented Apr. 28, 1914.

3 SHEETS—SHEET 1.

Witnesses

Inventor
Thomas O'Brien
By his Attorneys

T. O'BRIEN.
SEISMOGRAPH.
APPLICATION FILED DEC. 6, 1912.

1,095,022.

Patented Apr. 28, 1914.
3 SHEETS—SHEET 2.

Witnesses
Inventor
Thomas O'Brien.
By his Attorneys
Mason Fenwick & Lawrence

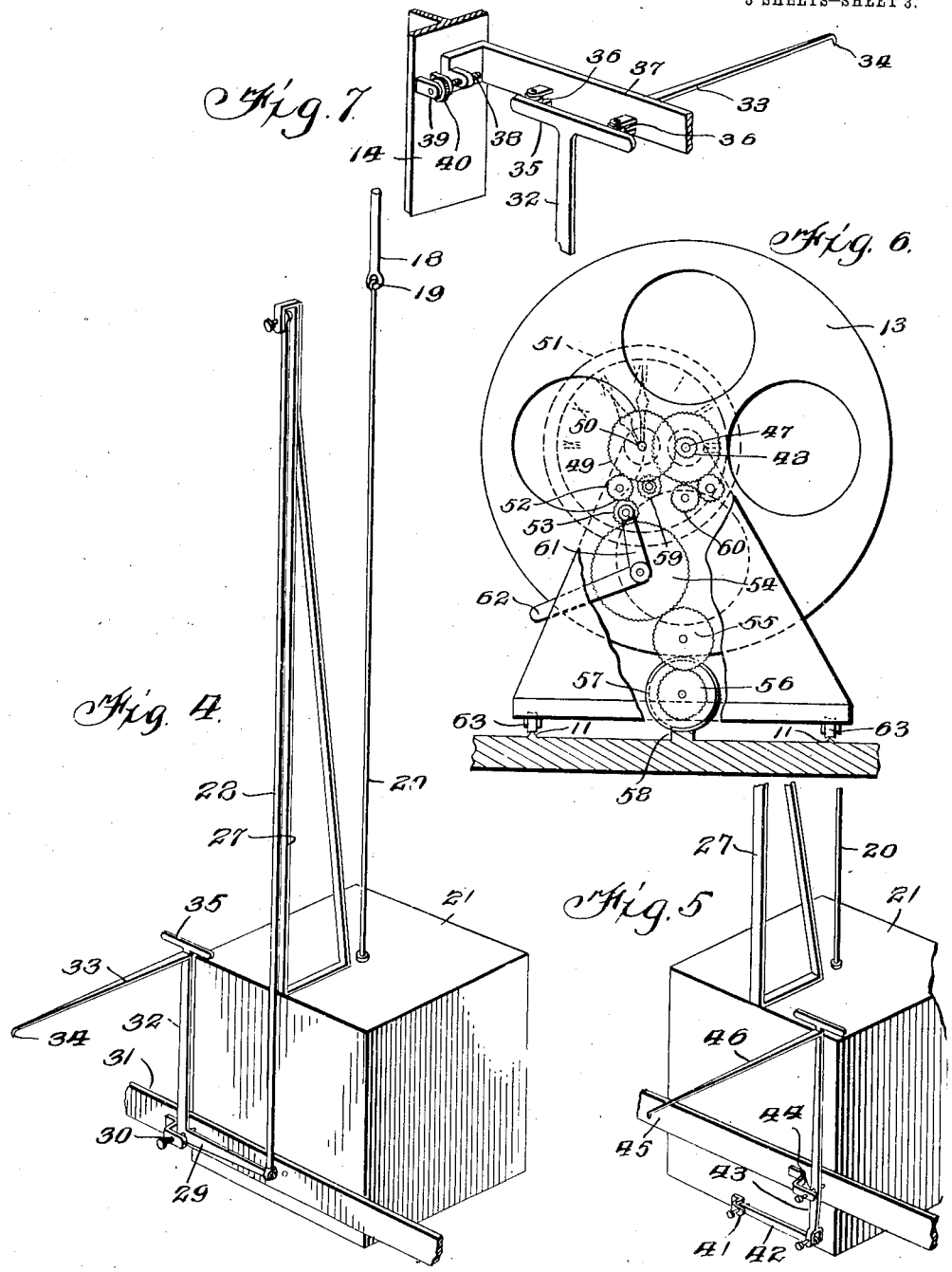

UNITED STATES PATENT OFFICE.

THOMAS O'BRIEN, OF BROOKLYN, NEW YORK, ASSIGNOR TO HENRY G. OPDYCKE, OF NEW YORK, N. Y.

SEISMOGRAPH.

1,095,022.   Specification of Letters Patent.   Patented Apr. 28, 1914.

Application filed December 6, 1912. Serial No. 735,337.

*To all whom it may concern:*

Be it known that I, THOMAS O'BRIEN, a citizen of the United States, residing at Brooklyn, in the county of Kings and State of New York, have invented certain new and useful Improvements in Seismographs; and I do hereby declare the following to be a full, clear, and exact description of the invention, such as will enable others skilled in the art to which it appertains to make and use the same.

This invention is an improvement in portable seismographs designed for measuring and recording vibrations in buildings, and in connection with general engineering work.

The principal object of this invention is in portable instruments of this kind to insure more accurate results in the measurement of vibrations without increasing the total weight to be carried by substituting a single inert mass or pendulum to be used in recording simultaneously both horizontal and vertical movements instead of two pendula aggregating the same weight and of similar density, as used heretofore; the functional utility of the mass being thereby doubled.

Another object is to provide an improvement in portable seismographs, such as generally used in measuring and recording vibrations in buildings, bridges and other engineering works, and at all places where accurate determinations of the amplitude and energy of both the horizontal and vertical movements are required. Separate pendula have been used hitherto for this purpose and as all calculations of relative movement are dependent for their accuracy upon the assumed stability of an inert mass, the advantages incident to the use of a single pendulum are apparent, the operation of an additional lever absorbing only a negligible amount of vibrational energy.

Another object of this invention is to provide means for detaching a pendulum for separate portage when it is needful to move the instrument, thus preventing injurious impact with more delicate parts thereof through careless handling, neglect or accident.

Another object of this invention is the simplification of portable instruments of this nature by reducing the number of pivotal contact points to a minimum.

A further object is to insure a more uniform movement of a recording cylinder by providing a fixed clutch connection with a motor.

A further object of this invention is also the provision of means for recording vertical vibrations from a single pendulum without interference from horizontal vibration and vice-versa, by pivotally connecting a rod attached to the recording lever to a standard rigidly attached to the pendulum at a point horizontally coincident with its axial line of suspension.

A further object of this invention is to provide simple means for rapidly placing and securing prepared charts on the cylinder by slotting the cylinder for the admission of two ends of the charts and affixing flexible buttons at near either end on the inner periphery, a quarter revolution of which will yield the requisite frictional pressure.

Figure 2:
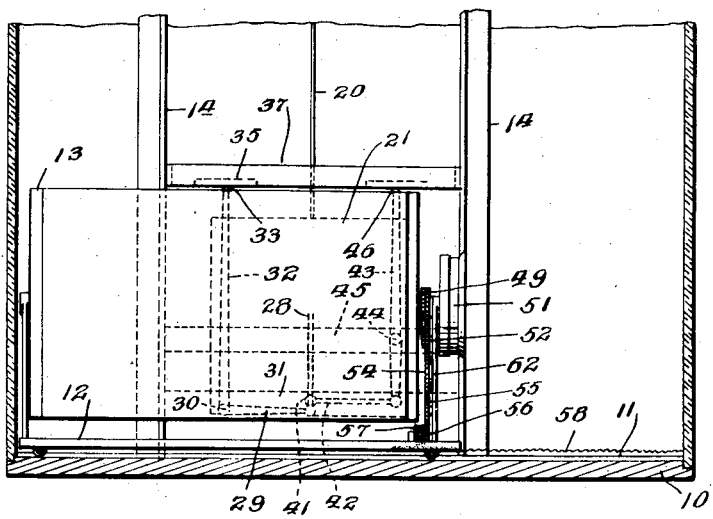
Figure 3:
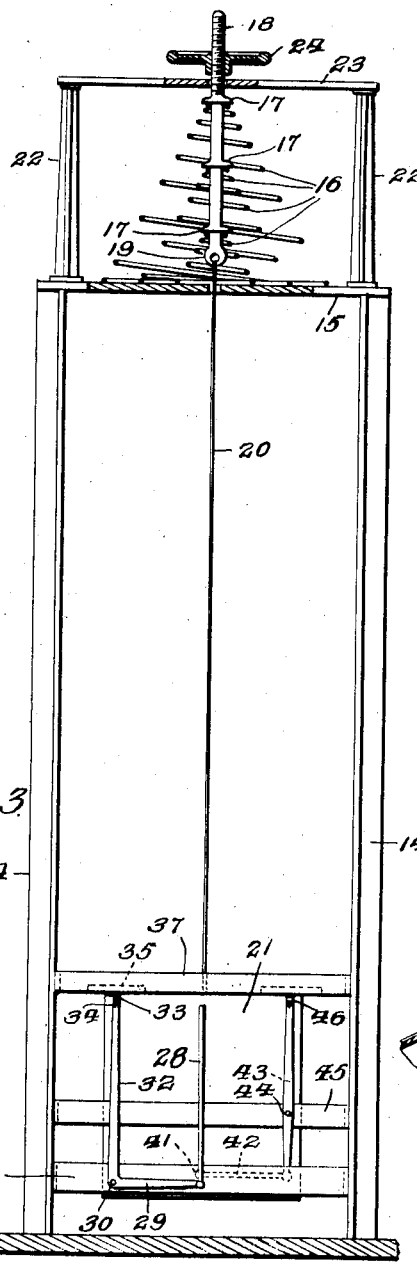
Figure 9:
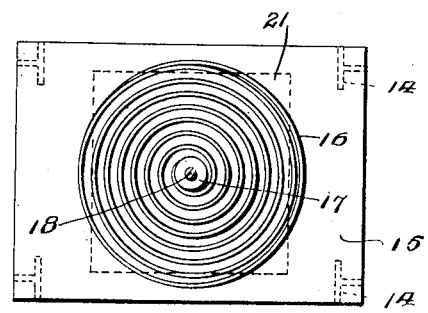
Figure 10:
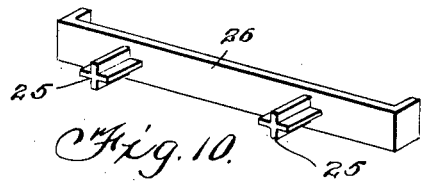
Figure 8:
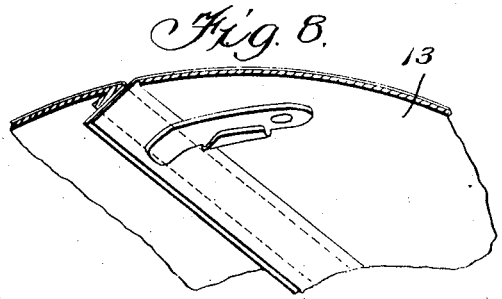

Further objects will be apparent from the following specification, appended claims and drawings, in which, Figure 1 is a plan view of my device showing parts thereof in section, Fig. 2 is a front elevation thereof showing parts broken away, Fig. 3 is an elevation of the pendulum showing its mounting and recording levers, Fig. 4 is a perspective view of the magnifying levers for recording the vertical vibrations of the pendulum, Fig. 5 is a similar view of the magnifying levers for recording the lateral vibrations of the pendulum, Fig. 6 is an end view of the recording drum showing the gear connections to a clock to impart rotary motion to the drum and longitudinal motion to the carriage which supports said drum, Fig. 7 is a perspective view of a portion of one of the recording levers, Fig. 8 is a perspective view of the means employed in fastening the record sheet to the drum, Fig. 9 is a plan view of the supporting means for the pendulum shown in Fig. 3, and Fig. 10 is a perspective view of one of the cheek members used to prevent oscillations of the pendulum in certain lateral directions.

In instruments of this character, it is desired to provide a pendulum with a supporting member which supporting member is carried by a base and which base carries a record sheet upon which to record any vibrations of the pendulum with respect to the base. In this particular case it is necessary to restrict the horizontal movement of the pendulum with respect to the base to a certain plane (the movement being free when the plane of the base is made coincident) and as it is desired also to record any relative vertical movement of the pendulum, it is necessary that a special construction be provided to permit vertical and lateral movement of the pendulum without mutual interference or disturbance of alinement of the several transmitting levers. To this end I provide a base 10 provided with tracks 11 upon which is mounted a carriage 12 which supports a recording drum 13 having a record sheet secured thereto. At any desired position with respect to said drum, I provide a stand comprising the uprights 14 and platform 15 upon which is mounted the supporting means for the pendulum. This supporting means comprises a plurality of springs 16 which are supported by the base 15 and bear against a flange or flanges 17, carried by a stem 18, which stem is provided at its lower end with an eye 19, to receive the cord or other supporting means 20, for the pendulum 21.

The support of an inert mass by a plurality of springs instead of a single spring is claimed as an improvement as and for the reason that the ratio of resistance to torsional strain in a spring has its expression in the terms of a series,—therefore, a spring capable of maintaining in equilibrium a mass of say twenty pounds has a more extended range of relative vertical movement than one capable of sustaining say one hundred and twenty pounds. The interference then with the inertia of such a suspended mass as the latter, if sustained by say six springs instead of one, should vibrational movement disturb the common base would be directly proportionate to range of movement indicated by torsional strain set up in the heavier and lighter springs. I have shown three springs but it is to be understood that more or less may be used as desired and the purpose of the use of a plurality of springs is to assure against any differential deflections common to a single spring incident to any two portions thereof. When it is desired to remove the pendulum, the weight thereof may be removed from the several springs 16 in the following manner. Rising from the platform 15 are standards 22 which support the platform 23 through which the threaded end of the stem 18 passes and upon this threaded portion is the removable hand-wheel 24 which by rotation in the proper direction bears against the platform 23 and raises the stem 18 above the action of the springs 16. The pendulum then being blocked from below and the hand-wheel removed, can be readily detached for separate portage.

I restrict the horizontal movement of the pendulum 21 to the plane of the base (for the reasons before stated) by cheek plates 25 which may be of any cross sectional shape but I have shown them in the shape of an X as this form gives the best bearing surface with the least resistance. These cheek plates may be supported by any desired means as for instance, by the angle irons 26 supported by the standard 14.

Vertical vibrations of the pendulum with respect to the remainder of the apparatus are recorded in the following manner and through the system of levers clearly shown in Fig. 4 of the drawing. Rising from the pendulum is a standard 27 to which the upper end of a link 28 is secured and to reduce any tendency of a horizontal vibration from affecting this link, the upper connection with the standard 27 is in alinement with but in advance of the connection for the pendulum supporting medium. This link is connected as by cone bearings to a bell crank lever 29 which is fulcrumed as at 30 to a cross bar 31 which cross bar is supported by two of the standards 14. The arm 32 of this bell crank lever is bent to form an arm 33 which carries the recording needle 34 at the free end thereof. A plate or guard 35 is formed on the upright arm 32 which plate is intended to bear against rollers 36 carried by a movable cross bar 37 which is carried by the screws 38 mounted in brackets 39 projecting from two of the standards 14. These screws are provided with thumb wheels 40 by which the screws are rotated to adjust the bar 37.

Fig. 5 of the drawing shows a series of levers employed in recording the relative lateral vibration of the pendulum parallel to the longitudinal dimension of the frame. Secured to the pendulum as at 41 is one end of a link 42 which has the opposite end thereof connected to the lower end of a lever 43 which is fulcrumed as at 44 to the cross bar 45 which cross bar 45 is supported by two of the standards 14. The upper end of the lever 43 is quite similar in construction with the arm of the lever 32 so that the description of the construction of the lever 32 will suffice. For purposes of distinction in subsequent description of the invention the lever for recording the lateral vibrations may be designated by the numeral 46.

The levers 32 and 46 may be swung from contact with the record sheet by adjusting the bar 37 so as to cause the rollers 36 carried thereby, to forcibly contact with the plates or guards 35 and thereby swing the levers 33 and 46 in a vertical direction sufficiently far to permit removal and application of the record sheet. These plates 35 serve to prevent any twisting of the vertical levers 32 and 43 due to vibration of the levers and the angle portions.

The record sheet is fastened to the drum 13 by folding one end of the sheet and passing it through a narrow slot longitudinal with the axis, then winding it around the drum and passing the other end through the same slot, the ends being held in position by the revolving buttons attached to its inner periphery as shown in Fig. 11, so that as the drum rotates the record sheet rotates and also moves longitudinally as hereinafter shown so as to avoid the imposition of one series of records on another. The drum 13 is provided with the usual heads which are mounted upon a shaft 47, which shaft is mounted in bearings carried by the carriage 12 and this shaft is rotated by the pinion 48 meshing with the gear 49 carried by the arbor 50 of the clock 51.

The ratio of the gears 48 and 49 is such that the drum will rotate sufficiently fast to remove the recorded vibrations from the path of further records and is shown to be three to one. The gear 49 meshes with an idler 52 which in turn meshes with a swinging idler 53 through which motion is transmitted through a train of gears 54, 55 and 56 to a worm gear 57 which meshes with a rack 58 secured to the base 10. When it is desired to increase the speed of the longitudinal movement I provide a series of idlers which may mesh with a gear 53 to increase the speed of the rotation thereof and referring to the drawings 59 indicates an idler which is intended to produce two movements of the gear 53 to one revolution of the idler 52 and the idler 60 is intended to produce three revolutions of the idler 53 to the one of the idler 52. The idler 53 is carried by an arm 61 which is fulcrumed on the shaft of the gear 54 and the arm 61 is swung by the handle 62. The carriage 12 is mounted upon rollers 63 which run on the tracks 11 formed in the base.

When it is desired to ascertain the extent of vibration in certain directions as in structural work, the apparatus is placed to allow oscillation of the pendulum in the desired direction. Then as any vibration of the foundation upon which the base of the apparatus is placed, occurs, the movement of said base with respect to the inert mass causes the lever intended for recording the horizontal vibrations, to create a record upon a specially prepared chart carried by the cylinder. The lever intended for recording the vertical vibrations can operate irrespectively of the lever for recording the horizontal vibrations, and therefore, the vertical vibrations may be recorded with the apparatus placed in any normal position.

When it is desired to transport the apparatus, manipulation of the hand wheel on the threaded stem of the pendulum supporting bar allows the pedulum to be raised to enable a temporary support to be placed under the pendulum, when the supporting wire or cable may be released and the pendulum detached.

Modifications may be made within the scope of this invention and I do not restrict myself to the identical form shown which is submitted for illustrative purposes only.

Having thus described my invention, I claim:

1. In a portable seismograph, a single pendant mass or pendulum fitted and adapted to perform double functions of two separate pendula in the matter of measuring and recording horizontal and also vertical vibrations.

2. In a portable seismograph, a single pendulum, a plurality of springs sustaining said pendulum, a platform sustaining said springs, and a base rigidly connected with and sustaining said platform.

3. In a portable seismograph, a base, a pendulum carried thereby for universal movement therewith, separate levers suitably fulcrumed to said base and jointedly connected with said pendulum and capable of responding freely to any relative movement of said base with regard to said pendulum, said separate levers having extension points for contact with a suitably prepared chart.

4. In a portable seismograph, a record cylinder, a pendulum, said cylinder having an axial and circumferential movement, and said pendulum having a horizontal and vertical freedom of movement, and levers connected to said pendulum to record vibrations on said cylinder, said levers having freedom of movement in their intended direction independent of each other.

5. In a portable seismograph, a record cylinder and pendulum, levers connected to said pendulum to transmit and magnify vibrations of said pendulum with respect to said cylinder, said levers being connected to transmit the intended vibrations independent of others and means to limit the vibratory movement of said pendulum in certain directions.

6. In a portable seismograph, a suspended pendulum, a support for said pendulum, a base for said pendulum and support and a plurality of springs interposed between said base and support.

7. In a portable seismograph, a single pendulum, an extension rising therefrom, means providing for the transmission of amplified vertical vibrations without interference from horizontal vibrations, said means comprising a lever fitted and provided to transmit such vibrations, connection from said lever to the extension rising from said pendulum at a point corresponding to the center of the arc of oscillation and where consequently only an upward and downward movement of the pendulum can be transmitted to such lever.

8. In a portable seismograph, a base, a pendulum suspended on said base, a support carried by said base for said pendulum, a plurality of spring interposed between said support and said pendulum, said pendulum being mounted for oscillation in vertical and horizontal directions, and means for restricting certain horizontal oscillations of said pendulum.

9. In a portable seismograph, a base, a specially prepared record sheet, levers carried by said base for making a record on said record sheet, said levers being fulcrumed indirectly to said base, said levers having guides extending therefrom, and an adjustable plate carried by said base, said adjustable plate having engagement with the guides of said levers to prevent twisting of said levers.

In testimony whereof I affix my signature in presence of two witnesses.

THOMAS O'BRIEN.

Witnesses:
GEORGE L. THOM,
HUGO MOCK.